US012639086B2

(12) United States Patent
Arians et al.

(10) Patent No.: US 12,639,086 B2
(45) Date of Patent: May 26, 2026

(54) CONTEXT-BASED USER INTERFACE CUSTOMIZATION

(71) Applicant: SAP SE, Walldorf (DE)

(72) Inventors: Silke Arians, Hamburg (DE); Matthias Schmalz, Heidelberg (DE); Angelika Kirilin, Leimen (DE); Mikhail Benderskiy, Walldorf (DE); Kevin Edinger, Sinsheim (DE); Thuy Sophie Boehm, Laudenbach (DE); Christian Voshage, Reilingen (DE)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 18/661,273

(22) Filed: May 10, 2024

(65) Prior Publication Data

US 2025/0348332 A1      Nov. 13, 2025

(51) Int. Cl.
*G06F 9/451* (2018.01)

(52) U.S. Cl.
CPC .................................. *G06F 9/451* (2018.02)

(58) Field of Classification Search
CPC ...................................................... G06F 9/451
See application file for complete search history.

(56) References Cited

U.S. PATENT DOCUMENTS 5,911,143 A * 6/1999 Deinhart ............... G06F 21/604
707/999.009
6,023,765 A * 2/2000 Kuhn .................. G06F 21/6218
726/4

| 2010/0223557 A1 * | 9/2010 | Kenney .................. | G06Q 10/10 |
| | | | 707/E17.014 |
| 2011/0289010 A1 * | 11/2011 | Rankin, Jr. ............ | G06Q 10/10 |
| | | | 707/727 |
| 2012/0224057 A1 * | 9/2012 | Gill ........................ | G06F 21/577 |
| | | | 348/143 |
| 2017/0235466 A1 * | 8/2017 | Tanwir .................. | G06F 3/0481 |
| | | | 715/738 |
| 2019/0391825 A1 * | 12/2019 | Jann ...................... | G06F 3/0482 |
| 2022/0027856 A1 * | 1/2022 | Piaskowski ........ | G06Q 10/0637 |

(Continued)

OTHER PUBLICATIONS

"Beginner's Guide to WordPress User Roles and Permissions", WPBeginner LLC., [Online]. Retrieved from the Internet: <URL: https://www.wpbeginner.com/beginners-guide/wordpress-user-roles-and-permissions/#:~:text=But%20if%20you%20want%20to,activate%20and%20install%20the%20plugin.>, (Jan. 22, 2024), 9 pgs.

(Continued)

*Primary Examiner* — Tadesse Hailu

(74) *Attorney, Agent, or Firm* — SCHWEGMAN LUNDBERG & WOESSNER, P.A.

(57) ABSTRACT

Various examples are directed to systems and methods for providing a user interface to a user. A computing system may receive, from a user, a request for a first page of the user interface. The computing system may access context data for the user indicating that the user is associated with a first role and also associated with a second role. The computing system may select either a first adaptation configuration file associated with the first role or a second adaptation configuration file associated with the second role. The computing system may render the first page by applying at least one modification associated with the selected adaptation configuration file and serve the first page to the user.

20 Claims, 10 Drawing Sheets

(56)  References Cited

U.S. PATENT DOCUMENTS

| | | | |
|---|---|---|---|
| 2023/0394564 A1* | 12/2023 | Waldrep | G06Q 50/163 |
| 2025/0335849 A1* | 10/2025 | Buscaglia | G06Q 10/0633 |

OTHER PUBLICATIONS

"How to Personalize Access to Applications and Modules in ServiceNow as an Administrator", PROCESS.ST, [Online]. Retrieved from the Internet: <URL: https://www.process.st/how-to/personalize-access-to-applications-and-modules-in-servicenow-as-administrator/>, (Accessed Apr. 25, 2024), 7 pgs.

Mazalon, Lucy, "Learn Salesforce Roles and Profiles in 5 Minutes (Ft. Permission Sets)", Salesforce Ben, [Online]. Retrieved from the Internet: <URL: https://www.salesforceben.com/salesforce-roles-profiles-permission-sets/>, (Nov. 24, 2021), 16 pgs.

Pedersen, Susanne Windfeld, et al., "Customize the user interface for user roles", Microsoft, [Online]. Retrieved from the Internet: <URL: https://learn.microsoft.com/en-us/dynamics365/business-central/dev-itpro/developer/devenv-role-customization>, (Jan. 15, 2022), 3 pgs.

Builder Blog, [Online]. Retrieved from the Internet: <URL: Shmeltzer, Shay, "Role Based Access Control in Visual Builder's UI", Oracle Visual https://blogs.oracle.com/vbcs/post/uiroles, (Aug. 23, 2022), 4 pgs.

* cited by examiner

300

302 — RECEIVE PAGE REQUEST

304 — ACCESS CONTEXT DATA

306 — ACCESS UI BASELINE DATA

308 — ACCESS ADAPTATION CONFIGURATION FILES FOR CONTEXTS

310 — SELECT ADAPTATION CONFIGURATION FILE BASED ON PRIORITY

312 — RENDER PAGE WITH SELECTED ADAPTION CONFIG. FILE

314 — SERVE PAGE

400

402 — RECEIVE SECOND PAGE REQUEST FROM USER

404 — SELECT ADAPTATION CONFIG. FILE FOR 2ND PAGE BASED ON PRIORITY

406 — RENDER 2ND PAGE WITH ADAPTATION CONFIG. FILE FOR 2ND PAGE

408 — SERVE 2ND PAGE

502 — RECEIVE PAGE REQUEST

504 — ACCESS CONTEXT DATA

506 — ACCESS UI BASELINE DATA

508 — ACCESS BATCH CHANGE CONFIGURATION FILE

510 — ACCESS ADAPTATION CONFIGURATION FILES FOR CONTEXTS

512 — SELECT ADAPTATION CONFIGURATION FILE BASED ON PRIORITY

514 — RENDER PAGE WITH BC CONFIG. FILE & SELECTED ADAPTION CONFIG. FILE

516 — SERVE PAGE

500

602 — RECEIVE REQUEST FOR SECOND CONTEXT VERSION OF PAGE

604 — RENDER WITH 2ND CONTEXT ADAPTATION CONFIG. FILE

608 — SERVE PAGE

600

700

CONTEXT-BASED USER INTERFACE CUSTOMIZATION

BACKGROUND

Software applications, including enterprise resource planning (ERP) applications, provide user interfaces to users. User interfaces include various elements such as, for example, icons, tables, charts, graphs, text entry fields, buttons, drop-down fields, and/or the like. Users may provide information to the software application and receive information from the software application via the user interfaces.

BRIEF DESCRIPTION OF DRAWINGS

The present disclosure is illustrated by way of example and not limitation in the following figures.

DETAILED DESCRIPTION

Figure 1:
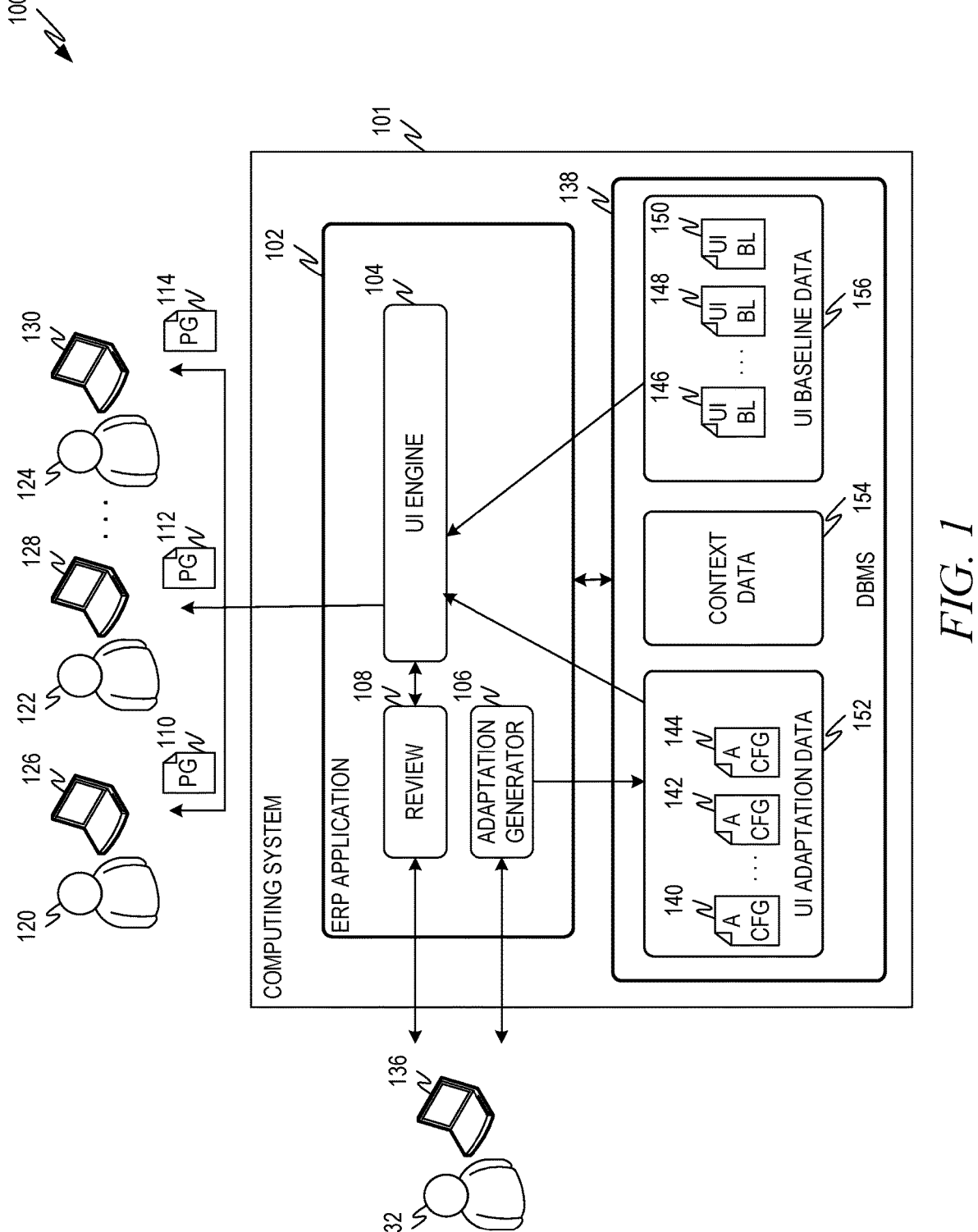
FIG. 1 is a diagram showing one example of an environment comprising a computing system executing an ERP application in conjunction with a database management system (DBMS).

A database management system (DBMS) can be implemented as part of a suite of software applications that execute together. For example, the DBMS may support various client processes that utilize the DBMS to manage data. In some examples, a DBMS is implemented with a suite of processes that implement an enterprise resource planning (ERP) software application. ERP applications are often used in conjunction with a DBMS to manage various different aspects of business operations. An example ERP software application is the S/4 HANA product available from SAP SE of Waldorf, Germany.

The ERP application generates and utilizes the data stored at the database management system to perform different enterprise operations. For example, an ERP application supporting a human resources operation may store employee records at the DBMS. An ERP application supporting accounting may use records managed by the DBMS to perform various accounting-related tasks such as generating and recording invoices, purchase orders, and the like. An ERP application supporting human resources management may perform various tasks related to, for example, using data managed by the DBMS to generate and manage payroll, benefits, and the like. Other ERP applications may perform other business tasks.

Various aspects of an ERP application involve presenting human-readable text to users. For example, an ERP application may provide users with messages that describe the operations of the ERP application. Also, in some examples, an ERP application may provide user interface pages to the users. The user interface pages may include text and/or graphics to explain the contents of the user interface page and/or to describe desired user inputs associated with input fields of the user interface.

An enterprise utilizing an ERP application may desire to have a custom user interface for the ERP application. For example, the enterprise may desire to provide a set of user interface elements that are specific to the needs of the enterprise. For example, an enterprise may desire to have different input fields, drop-down menus, and/or the like for receiving input from users. Also, in some examples, there may be buttons, labels, and/or other user interface elements that are relevant to some users and scenarios, but not to others.

In some examples, it is desirable to customize a user interface based on the role held by a user. Consider an example ERP application for managing accounting. A user in the accounting department may desire to see a user interface including a particular set of? user interface elements commonly used by the user with the accounting department role, such as for example, charts, graphs, input fields, and/or the like. Users in other departments may also utilize the accounting ERP application, for example, to manage expenses. These users in other roles may desire to see a more limited set of user interface elements such as for example, for entering business expenses for compensation. In practice, it may be challenging to modify a user interface on the fly for users having different roles. Another challenge arises when users have more than one role. Consider an example where a user is part of an accounting department, but also part of management. It may be desirable to provide that user with a user interface page customized for the user's management role over the user's accounting role.

Various examples address these and other challenges with a user interface comprising user interface baseline data that includes descriptions for a plurality of user interface elements. The user interface may also comprise adaptation configuration files. An adaptation configuration file may describe a set of modifications to the plurality of user interface elements described by the baseline data. The set of modifications may include, for example, omitting some user interface elements, modifying some user interface elements, changing the position of the user interface elements on one or more user interface pages, and/or the like.

In some examples, different adaptation configuration files may be associated with different user roles. For example, when a computing system loads a user interface page, it may access the user interface baseline data and adaptation configuration files associated with respective user roles of the requesting user. The adaptation configuration files may include priority data. The computing system may utilize the priority data of the respective adaptation configuration files to select an adaptation configuration file to apply. The computing system may apply the selected adaptation configuration file to the user interface baseline data to generate a user interface page, which can then be served to the user.

FIG. 1 is a diagram showing one example of an environment 100 comprising a computing system 101 executing an ERP application 102 in conjunction with a DBMS 138. In some examples, the ERP application 102 and DBMS 138 may be provided as a common product such as, for example, the S/4 HANA product available from SAP SE of Waldorf, Germany. Also, although the environment 100 of FIG. 1 includes an ERP application 102, it will be appreciated that the structure and techniques described with respect to FIG. 1 and herein may be applied to other types of software applications as well.

The computing system 101 may be implemented in an on-premise environment and/or in a cloud environment. In an on-premise environment, an enterprise utilizing the ERP application 102 and DBMS 138 may maintain the computing system 101 as an on-premise computing system. The ERP application 102 and DBMS 138 may be executed at the on-premise computing system.

In a cloud environment, the computing system 101 is implemented by one or more servers and/or other computing devices maintained by a cloud provider and accessible remotely. In a private cloud environment, the enterprise using the computing system 101 may provide applications, implement storage, and/or the like to implement the ERP application 102 and DBMS 138. In a public cloud environment, a cloud provider may maintain the computing system 101 and provide a number of tenancies. The cloud provider may provide and maintain executables to implement the ERP application 102 and DBMS 138. An enterprise may purchase a tenancy to permit users associated with that enterprise to access the computing system 101 to use the ERP application 102 and DBMS 138.

Users 120, 122, 124 may access the computing system 101 to interact with the ERP application 102 and DBMS 138. In some examples, users 120, 122, 124 may utilize user computing devices 126, 128, 130 to communicate with the computing system 101. User computing devices 126, 128, 130 may be and/or include various different types of computing devices such as, for example, desktop computers, laptop computers, tablet computers, mobile computing devices, and/or the like. It will be appreciated, that in some non-premise applications, a user may access the computing system 101 directly via input/output components of the computing system 101 such as, for example, a keyboard and/or a monitor.

The ERP application 102 comprises a UI engine 104. The UI engine 104 may be or comprise software executing at the computing system 101 to generate user interface pages 110, 112, 114 of a user interface. User interface pages 110, 112, 114 may be provided to various users 120, 122, 124 via user computing devices 126, 128, 130. The UI engine 104 is illustrated as a component of the ERP application 102. It will be appreciated that, in some examples, the UI engine 104 may be implemented outside of the ERP application 102 such as, for example, as a service executing at the computing system 101 and in communication with the ERP application 102. Also, although FIG. 1 depicts a single ERP application 102, in some examples, the UI engine 104 may service multiple ERP applications (not shown in FIG. 1).

The UI engine 104 may build user interface pages using UI baseline data 156 and UI adaptation data 152. The UI baseline data 156 may describe a base form of the user interface. For example, the UI baseline data 156 may describe a plurality of user interface pages that are part of the user interface. The UI baseline data 156 may also describe a set of all user interface elements for each page. The UI baseline data 156 may describe the user interface elements in a default position on the respective pages. The default position may be modified, for example, as described herein. The UI baseline data 156 may be in any suitable format. In some examples, the UI baseline data 156 is arranged using a JavaScript format. For example, UI baseline files 146, 148, 150 may comprise JavaScript files, hypertext markup language (HTML), and/or the like.

UI adaptation data 152 may describe changes to the user interface including, for example, to one or more of the plurality of user interface pages. In some examples, the UI adaptation data 152 may comprise various adaptation configuration files 140, 142, 144. In some examples, adaptation configuration files 140, 142, 144 are associated with respective contexts. A context describes circumstances in which a UI will be used. A context for use of a UI may include, for example, the identity of a user loading a UI, a role of the user, a geographic location of the user, an industry associated with the user, and/or the like. For example, adaptation configuration file 140 may be associated with a first context, adaptation configuration file 142 may be associated with a second context, and so on. The respective adaptation configuration files 140, 142, 144 may include data describing a set of modifications to one or more user interface pages corresponding to the context associated with the adaptation configuration file. Adaptation configuration files 140, 142, 144 may also comprise context priority data. The context priority data describes a priority level of the modifications described by the adaptation configuration file. Although various examples herein described context as a combination of elements such as, for example, geographic location, user role, industry, and/or the like, it will be appreciated that various arrangements may include adaptation configuration files that are specific to one particular type of context element. For example, some respective adaptation configuration files 140, 142, 144 may be specific to user role.

Context data data 154 may describe contexts describing how the user interface may be accessed. In some examples, context data 154 includes data describing one or more roles of the various users 120, 122, 124. A role may be based on a job or set of responsibilities of the user within the enterprise utilizing the computing system 101. The context data 154 may describe the role and, in some examples, may also describe resources of the computing system 101 accessible to the user 120, 122, 124 and/or other aspects of the role.

The UI engine 104 may receive a request for a user interface page of the plurality of user interface pages of the user interface. The request may be received from a user 120, 122, 124, for example, via a user computing device 126, 128, 130. In response to the request, the UI engine 104 may access context data 154 describing the context of the request. The context of the request may describe one or more roles associated with the requesting user 120, 122, 124, a geographic location associated with the requesting user 120, 122, 124, an industry associated with the requesting user 120, 122, 124, and/or the like . . . . In some examples, the requesting user 120, 122, 124 may be associated with multiple different contexts. For example, a user 120, 122, 124 may work in multiple offices in multiple different geographic locations, in multiple industries, and/or have multiple different roles.

The UI engine 104 may access UI baseline data 156 describing the requested page. The UI engine 104 may also access adaptation configuration files associated with the context or contexts of the requesting user 120, 122, 124. In some examples, there is a one-to-one relationship between adaptation configuration files 140, 142, 144 and contexts. Consider an example in which the user has two roles. The UI engine 104 may access a first adaptation configuration file associated with the first role and a second adaptation configuration file associated with the second role. Also, in some examples, a single role may be associated with multiple adaptation configuration files 140, 142, 144.

The UI engine 104 may utilize priority data from the respective adaptation configuration files 140, 142, 144 to select an adaptation configuration file for rendering the requested page. For example, the priority data from the adaptation configuration files 140, 142, 144 may indicate a priority for the context associated with the adaptation configuration file 140, 142, 144. The adaptation configuration file with the highest priority may be selected. Consider again the example in which the user has two roles. The first adaptation configuration file associated with the first role may indicate a first priority and the second adaptation configuration file associated with the first role and the second role may indicate a second priority. The UI engine 104 may select the adaptation configuration file indicating the highest priority. This may lead to a deterministic behaviour of the user interface. For example, users associated with the first role and the second role may be shown a page generated using the first adaptation configuration file and users associated with the second role, but not the first role, may be shown a page generated using the second adaptation configuration file.

The UI engine 104 may render the selected user interface page by applying the selected adaptation configuration file 140, 142, 144 to the UI baseline data 156. This may include, for example, modifying user interface elements indicated by the UI baseline data 156, removing user interface elements indicated by the UI baseline data 156, adding user interface elements not indicated by the UI baseline data 156, changing the positions or appearance of UI interface elements indicated by the UI baseline data 156, and/or the like. The resulting UI page 110, 112, 114 may be served to the requesting user 120, 122, 124 via respective user computing devices 126, 128?, 130.

FIG. 1 also shows an administrative user 132. The administrative user 132 may access the computing system 101 utilizing a user computing device 136. The user computing device 136 may be similar to the user computing devices 126, 128, 130 described herein. The administrative user 132 may generate and/or monitor user interface pages 110, 112, 114 provided to various users 120, 122, 124 having different contexts. For example, the administrative user 132 may access an adaptation generator engine 106. The adaptation generator engine 106 may be utilized by the administrative user 132 to generate UI adaptation data 152. For example, the administrative user 132 may indicate modifications to the UI baseline data 156 for a particular context. The administrative user 132 may also indicate a priority associated with the particular context. The adaptation generator engine 106 may utilize this information to generate a corresponding adaptation configuration file 140, 142, 144.

In some examples, the administrative user 132 may also access an review engine 108. The review engine 108 may render versions of user interface pages using UI adaptation data 152 and UI baseline data 156. The administrative user 132 may be provided with renderings of a baseline version of one or more user interface pages in conjunction with modified versions of the user interface pages generated by applying various adaptation configuration files 140, 142,

144. This may allow the administrative user 132 to make modifications to the various adaptation configuration files 140, 142, 144 as desirable.

Figure 2:
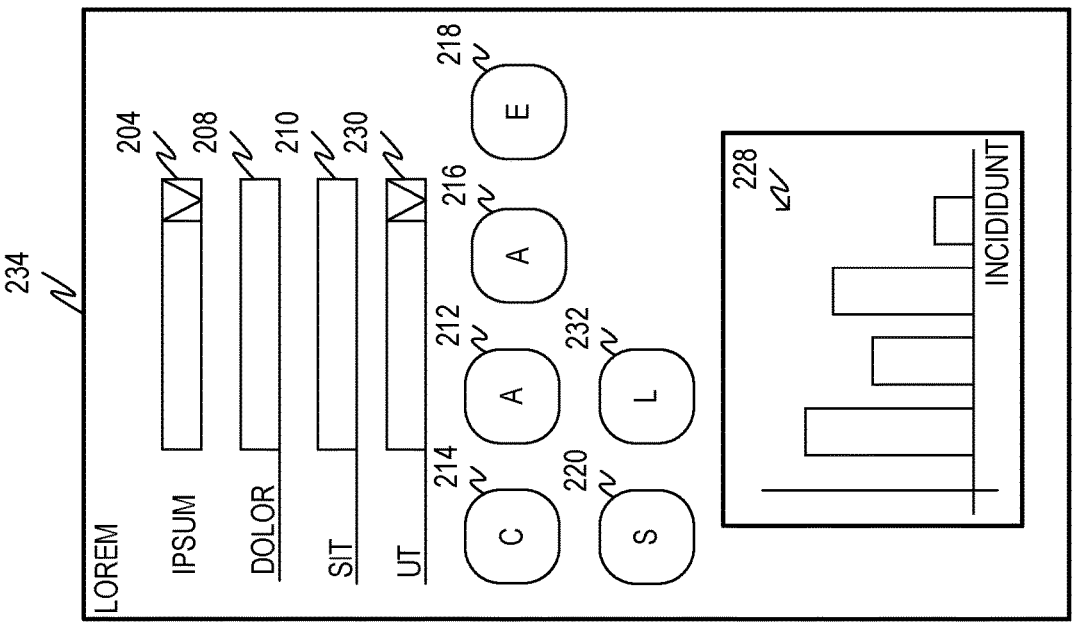
FIG. 2 is a diagram showing two example user interface pages.
Figure 2:
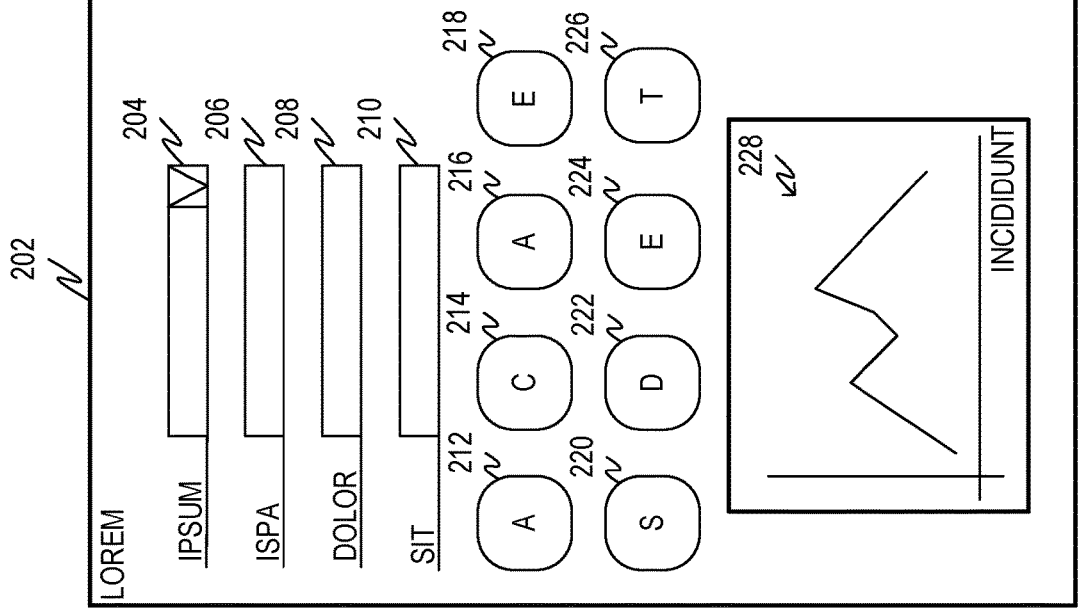

FIG. 2 is a diagram showing two example user interface pages 202, 234. It will be appreciated that various user interface pages may have different sizes, profiles, and/or combinations of user interface elements different than what is shown in FIG. 2. In the example of FIG. 2, the user interface page 202 is generated from the UI baseline data 156. Accordingly, the user interface page 202 comprises user interface elements according to a base or default version of the user interface. In this example, the user interface page 202 comprises a drop-down menu input field 204 and text input fields 206, 208, 210. The user interface page 202 also comprises icons 212, 214, 216, 218, 220, 222, 224, 226. The icons 212, 214, 216, 218, 220, 222, 224, 226 may be selectable by a user to prompt an action such as, the launching of an output, the display of an additional user interface page, a modification to the user interface page 202, and/or the like.

In some examples, an adaptation configuration file may also indicate a change to a state of one or more user interface elements relative to the default version of the user interface page indicated by the UI baseline data 156. For example, in the user interface page 202, the data output field 228 is arranged in the form of a line graph. In the user interface page 234, the state of the data output field 228 is modified to display data in the form of a bar graph. Other example ways in which the state of the user interface elements may be changed in include, for example, changing the data that is displayed at the user interface element, changing an appearance of the user interface element, changing the menu options available in a drop-down menu or similar user interface element, and/or the like.

The user interface page 234 shows a result of applying an example adaptation configuration file 140, 142, 144 to the UI baseline data 156 describing the user interface page 202. In this example, the user interface page 234 omits user interface elements including text input field 206 and icons 222, 224, 226. The user interface page 234 also includes additional UI elements such as drop-down menu 230 and icon 232. Data output field 228 is to display data in a different format (e.g. bar graph instead of line graph). Also, in the example of FIG. 2, the positions of user interface elements, such as icons 212, 214, are modified.

Figure 3:
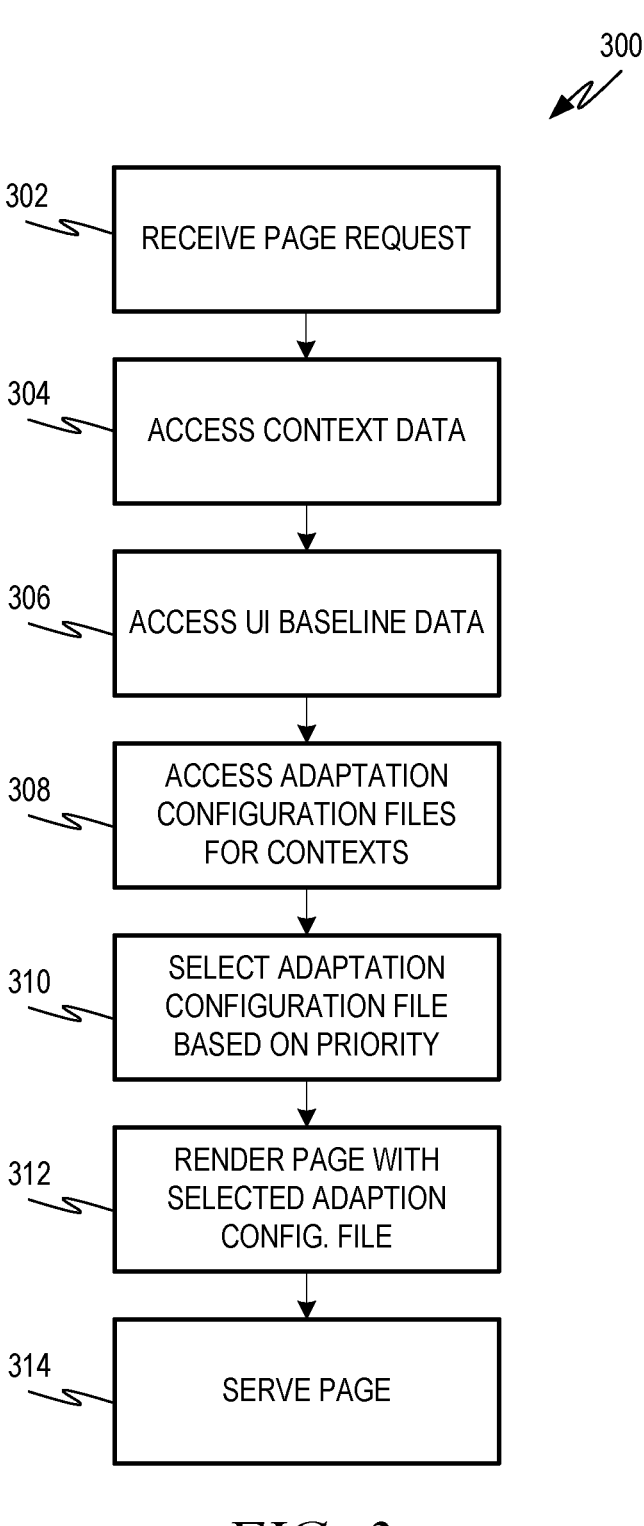
FIG. 3 is a flowchart showing one example of a process flow that may be executed in the environment of FIG. 1 to provide a user interface page to a user.

FIG. 3 is a flowchart showing one example of a process flow 300 that may be executed in the environment 100 of FIG. 1. At operation 302, the UI engine 104 may receive a page request. The page request may specify a page of the user interface that is to be rendered and served. The page request may originate from a user, such as, from one of the users 120, 122, 124.

At operation 304, the UI engine 104 may access context data 154 associated with the requesting user. The context data 154 may indicate that the requesting user is associated with a plurality of different contexts such as, for example, multiple different user roles, multiple different industries, multiple different geographic locations, and/or the like.

At operation 306, the UI engine 104 may access UI baseline data 156 describing the requested user interface page. At operation 308, the UI engine 104 may access adaptation configuration files for the contexts indicated by the context data 154. For example, if the user is associated with two different roles, then the UI engine 104 may access two adaptation configuration files 140, 142, 144 associated, respectively, with the two roles of the user. If the user is only associated with a single role, then the UI engine 104 may retrieve a single adaptation configuration file 140, 142, 144 associated with that role.

At operation 310, the UI engine 104 may select an adaptation configuration file from the access adaptation configuration files based on priority data for the respective adaptation configuration files. For example, if the priority data of a first adaptation configuration file indicates a first priority and the priority data of a second adaptation configuration file indicates a second priority, then the UI engine 104 may determine whether the first priority or the second priority is higher and select the corresponding adaptation configuration file. In example implementations where the requesting user is associated with a single context, such as, for example, a single role, operation 310 may be omitted.

At operation 312, the UI engine 104 may render the requested UI page based on the selected adaptation configuration file. This may include, for example, removing user interface elements, adding user interface elements, modifying the state of user interface elements, modifying the position of user interface elements, and/or the like. At operation 314, the UI engine 104 may serve the rendered UI page to the requesting user via a user computing device.

In some examples, the UI engine 104 may resolve adaptation configuration file priorities on a page-by-page basis. For example, it may be desirable to prioritize contexts differently for different pages. Consider an example in which a user is associated with two roles. For some pages, it may be desirable to prioritize the first role whereas for other pages it may be desirable to prioritize the second role Accordingly, the user would see some user interface pages rendered according to adaptation configuration files associated with the first role and other user interface pages rendered according to adaptation configuration files associated with the second role.

Figure 4:
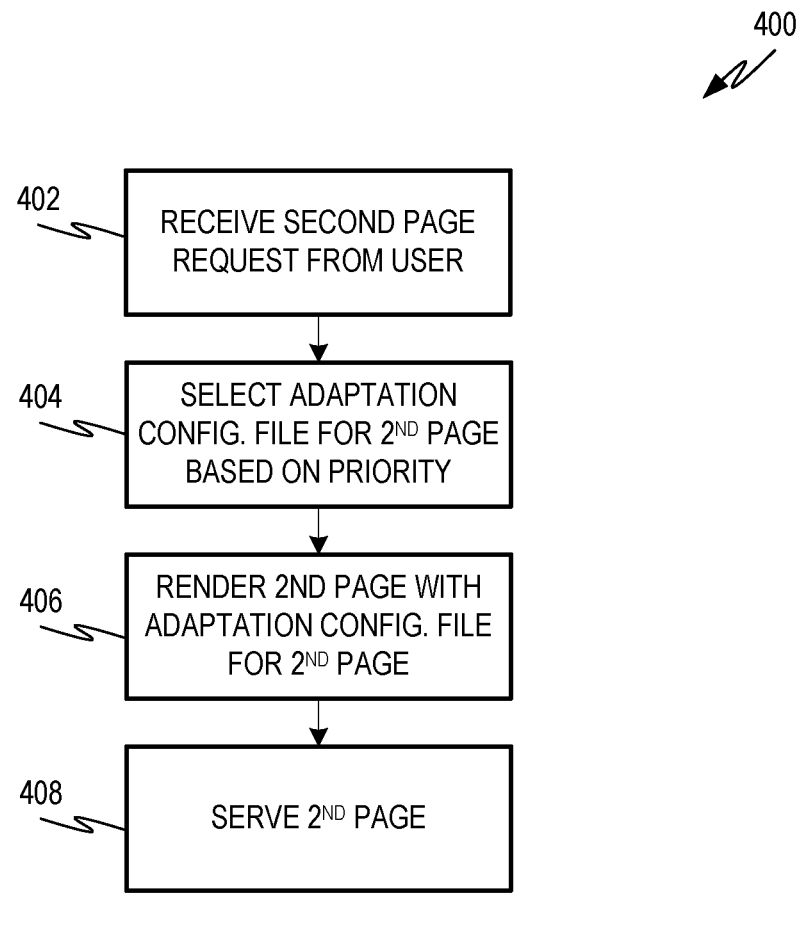
FIG. 4 is a flowchart describing an example of a process flow 400 that may be performed in the environment of FIG. 1 to provide a second user interface page to a user.

FIG. 4 is a flowchart describing one example of a process flow 400 that may be performed in the environment 100 of FIG. 1. The process flow 400 may be executed for a user having multiple associated contexts after a first page has been served to the user arranged according to a first configuration adaptation file associated with one of the user's multiple contexts. At operation 402, the UI engine may receive a second page request from the user. In some examples, the second page request may be made through an ERP application different than the ERP application associated with the first page request. At operation 404, the UI engine 104 may select an adaptation configuration file for the second page based on priority associated with the adaptation configuration files. The selected adaptation configuration file may be associated with the same context as the same adaptation configuration file that was selected to render the first page or may be associated with a different adaptation configuration file. At operation 406, the UI engine 104 may render the second UI page with the adaptation configuration file selected for the second UI page. At operation 408, the UI engine 104 may serve the second page to the user, for example, via a user computing device 126, 128, 130.

In some examples, it is desirable to make modifications to user interface pages of the user interface across all users, for example, without regard to context. This may be in addition to the context-specific changes described by various adaptation configuration files 140, 142, 144. In some examples, this may be achieved by utilizing batch change configuration files. A batch change configuration file may be associated with one or more pages of a user interface and may describe modifications that are applied, for example, without regard to context.

Figure 5:
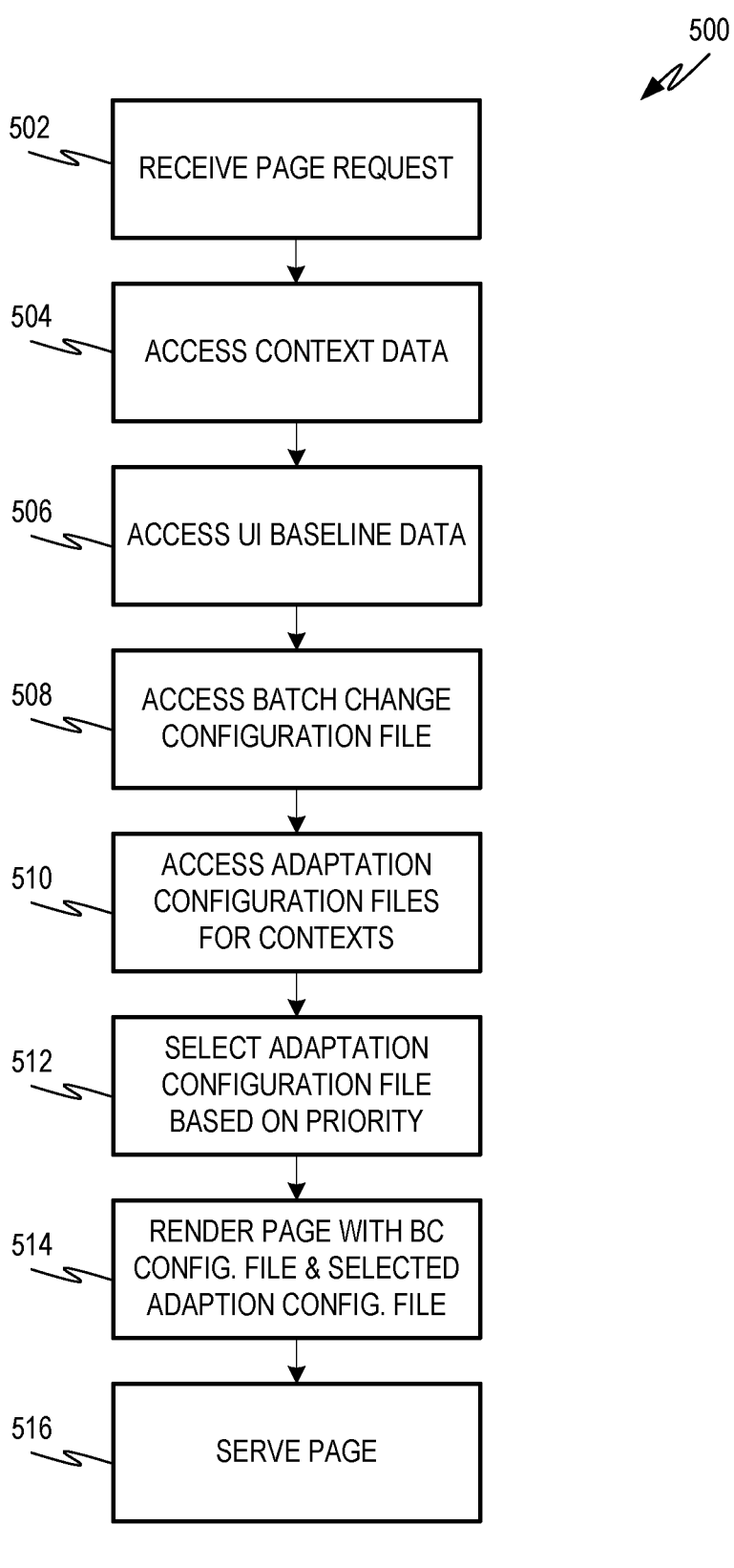
FIG. 5 is a flowchart showing one example of a process flow 500 that may be executed in the environment 100 of FIG. 1 to implement a batch change to a user interface page.

FIG. 5 is a flowchart showing one example of a process flow 500 that may be executed in the environment 100 of FIG. 1 to implement a batch change to a user interface page. At operation 502, the UI engine 104 may receive a page request. The page request may specify a page of the user interface that is to be rendered and served. The page request may originate from a user, such as, from one of the users 120, 122, 124.

At operation 504, the UI engine 104 may access context data 154 associated with the requesting user. The context data 154 may indicate that the requesting user is associated with a plurality of different contexts, such as different roles. At operation 506, the UI engine 104 may access UI baseline data 156 describing the requested user interface page. At operation 508, the UI engine 104 may access one or more batch change configuration files associated with the requested page.

At operation 510, the UI engine 104 may access adaptation configuration files for the contexts indicated by the context data. If the user is only associated with a single context, such as a single role, then the UI engine 104 may retrieve a single adaptation configuration file 140, 142, 144 associated with that context.

At operation 512, the UI engine 104 may select an adaptation configuration file from the access adaptation configuration files based on priority data for the respective adaptation configuration files. For example, if the priority data of a first adaptation configuration file indicates a first priority and the priority data of a second adaptation configuration file indicates a second priority, then the UI engine 104 may determine whether the first priority or the second priority is higher and select the corresponding adaptation configuration file. In example implementations where the requesting user has only a single context, operation 512 may be omitted.

At operation 514, the UI engine 104 may render the requested UI page based on the batch change configuration file and the selected adaptation configuration file. This may include, for example, removing user interface elements, adding user interface elements, modifying the state of user interface elements, modifying the position of user interface elements, and/or the like. At operation 516, the UI engine 104 may serve the rendered UI page to the requesting user via a user computing device.

In some examples, it may be desirable for a user to override a priority selection made by the UI engine 104 based on priority data. Consider an example user who has roles into different departments of an enterprise such as, for example, an engineering department and a maintenance department. There may be some circumstances in which the user would prefer to view versions of the UI pages optimized for the user's engineering department role and other circumstances in which the user would prefer to view versions of the UI page optimized for the user's maintenance department role.

Figure 6:
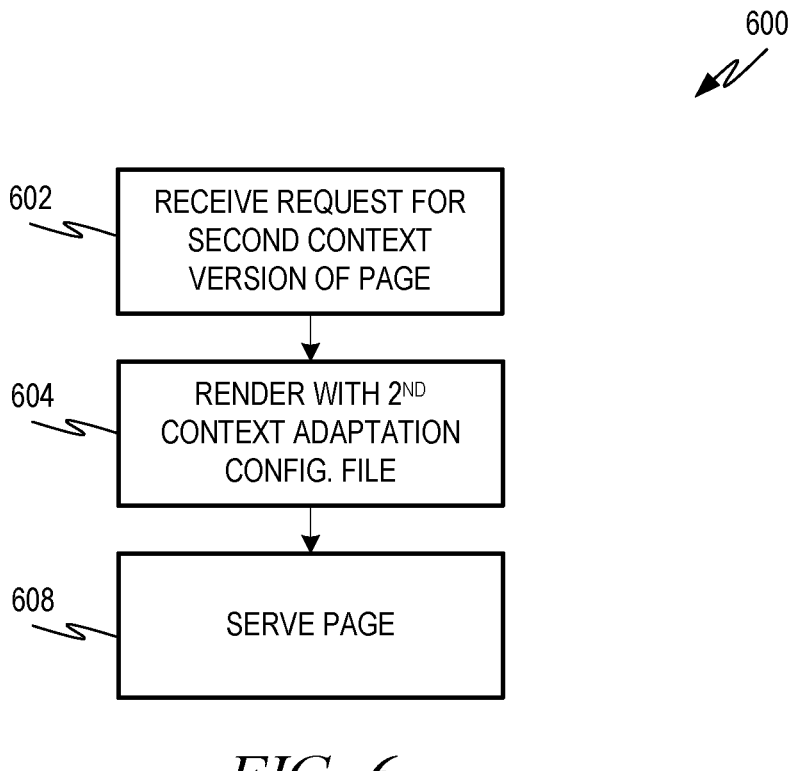
FIG. 6 is a flowchart showing one example of a process flow that may be executed in the environment of FIG. 1 to override priority selection.

FIG. 6 is a flowchart showing one example of a process flow 600 that may be executed in the environment 100 of FIG. 1 to override context selection, for example, by overriding priority associated with different adaptation configuration files. The process flow 600, in some examples, may be executed after the user has requested and been served a version of a user interface page according to an adaptation configuration file associated with a first context. U At operation 602, the UI engine 104 may receive a request for a version of the user interface page associated with the second context, for example, generated according to a different adaptation configuration file. The request may be received in various different forms. In some examples, the user interface page comprises a user interface element, such as a button or menu selection, that, when selected, provides to the UI engine 104 for the request to re-render the page for a different context (e.g., a different role, geographic location, industry, and/or the like). In other examples, the user may access the UI page using a browser or other suitable application. The user may access the page associated with a different context by providing an alternative universal resource locator (URL) address.

At operation 604, the UI engine 104 may render the requested page using an adaptation configuration file or files associated with the second context of the user. An operation 608, the UI engine 104 may serve the rendered second context version of the UI page to the user, for example, via a user computing device.

Figure 7:
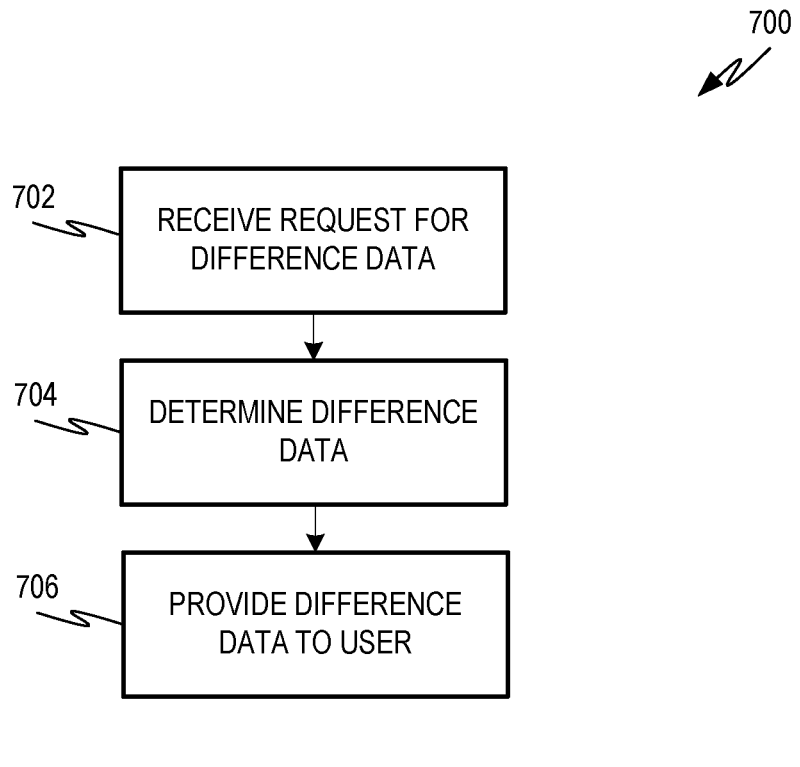
FIG. 7 is a flowchart showing one example of a process flow that may be executed in the environment of FIG. 1 to provide an administrative user with difference data describing a difference between two versions of a user interface page.

FIG. 7 is a flowchart showing one example of a process flow 700 that may be executed in the environment 100 of FIG. 1 to provide an administrative user 132 with difference data describing a difference between two versions of a user interface page. In some examples, the process flow 700 may be executed by the review engine 108.

At operation 702, the review engine 108 may receive a request for difference data. The request for difference data may specify at least two versions of a user interface page. At least one of the versions may be associated with a particular user role or other context. In some examples, one of the indicated versions is the default version of the user interface page associated with UI baseline data 156.

At operation 704, the review engine 108 may determine difference data describing a difference or differences between the indicated versions of the user interface page. This may include, for example, rendering the indicated user interface page or pages and/or generating textual data describing the differences. At operation 706, the review engine 108 may provide the difference data to the administrative user 132.

Figure 8:
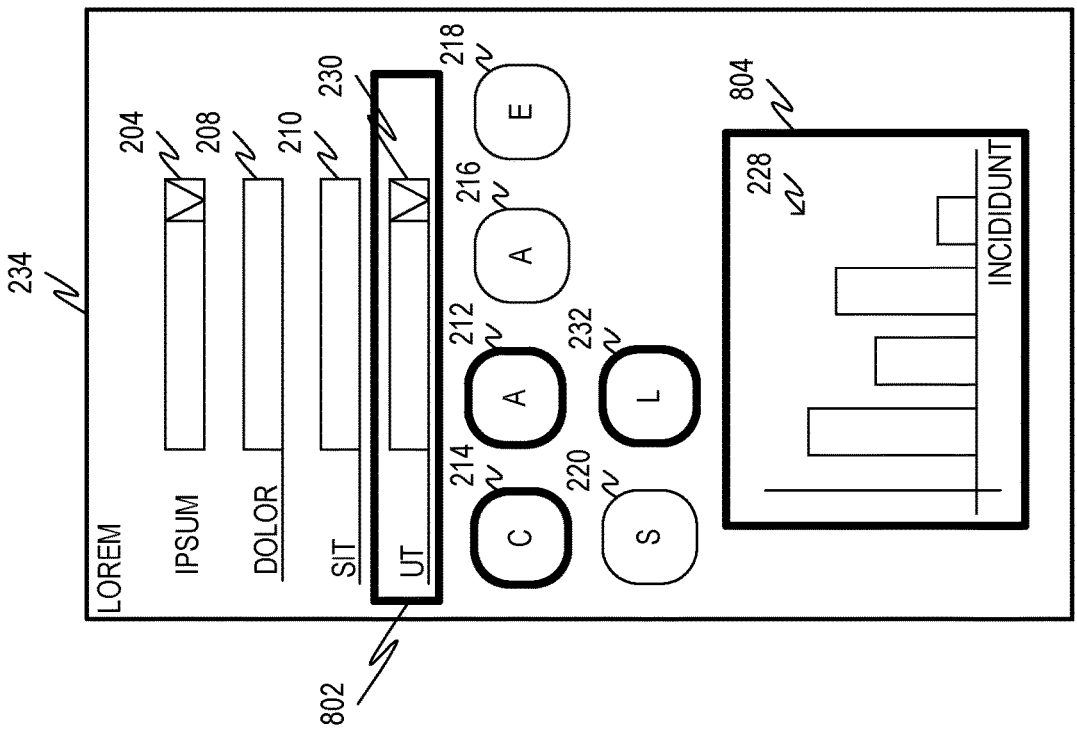
FIG. 8 is a diagram showing the two example user interface pages of FIG. 2.
Figure 8:
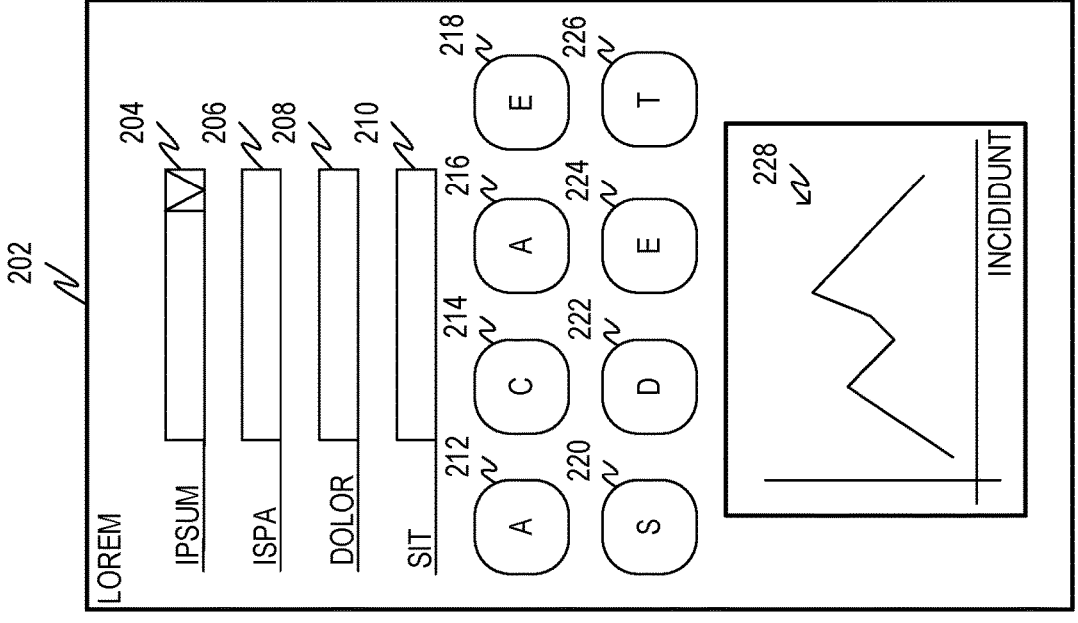

FIG. 8 is a diagram showing the two example user interface pages 202, 234 of FIG. 2. In this example, the user interface page 234 is annotated to show difference data indicating differences between the two user interface pages 202, 234. For example, new drop-down menu 230 is accentuated by box 802. Also, the modification to the data output field 228 is indicated by a box 804. New icon 232 is indicated by a visual modification, in this example a bolded edge. The icons 212, 214, which have different positions in the user interface page 234, are also indicated by a visual modification, in this example also a bolded edge. In some examples, the review engine 108 may provide difference data to the administrative user 132 by serving the user interface pages 202, 234 to the administrative user in the form shown by FIG. 8.

EXAMPLES

Example 1 is a computing system for serving a user interface to a user, the computing system comprising: at least one processor programmed to perform operations comprising: receiving, from a user, a request for a first page of the user interface; accessing user rolecontext data for the user, the user role datacontext data indicating that the user is associated with a first role and also associated with a second role; accessing user interface baseline data describing a plurality of user interface elements; accessing a first adaptation configuration file associated with the first role, the first adaptation configuration file describing a first set of modifications to the plurality of user interface elements, and the first adaptation configuration file comprising first role priority datapriority data; accessing a second adaptation configuration file associated with the second role, the second adaptation configuration file describing a second set of modifications to the plurality of user interface elements, and the second adaptation configuration file comprising second role priority datapriority data; selecting the first adaptation configuration file, the selecting being based at least in part on the first role priority datapriority data and the second role priority datapriority data; rendering the first page of the user interface, the rendering comprising applying a portion of the first set of modifications to the plurality of user interface elements; and serving the first page of the user interface to the user.

In Example 2, the subject matter of Example 1 optionally includes the operations further comprising: receiving, by the computing system, a request for a second page of the user interface, the second page being different than the first page; selecting, by the computing system, the second adaptation configuration file for the second page, the selecting being based at least in part on the first role priority datapriority data and the second role priority datapriority data; and rendering the second page, at least in part by applying a portion of the second set of modifications to the plurality of user interface elements.

In Example 3, the subject matter of any one or more of Examples 1-2 optionally includes the rendering of the first page of the user interface comprising: determining a set of user interface elements for the first page of the user interface based at least in part on the user interface baseline data and the first adaptation configuration file; and determining a set of user interface element states for the set of user interface elements based at least in part on the user interface baseline data and the first adaptation configuration file, the rendering of the first page of the user interface being based at least in part on the set of user interface element states.

In Example 4, the subject matter of any one or more of Examples 1-3 optionally includes the operations further comprising accessing, by the computing system, a batch change configuration file describing a batch set of modifications to the plurality of user interface elements, the rendering of the first page of the user interface further comprising applying the batch set of modifications to the plurality of user interface elements.

In Example 5, the subject matter of any one or more of Examples 1-4 optionally includes the operations further comprising: receiving, by the computing system and from the user, a request to receive a second role version of the first page of the user interface based on the second role; applying a portion of the second set of modifications to the plurality of user interface elements to generate the second role version of the first page; and serving the second role version of the first page to the user.

In Example 6, the subject matter of Example 5 optionally includes the request to receive the second role version of the first page being based at least in part on the user interacting with a user interface element at the first page of the user interface.

In Example 7, the subject matter of any one or more of Examples 5-6 optionally includes the request to receive the second role version of the first page being based at least in part on the user providing a second role address associated with the first page.

In Example 8, the subject matter of any one or more of Examples 1-7 optionally includes the operations further comprising determining, by the computing system, difference data describing at least one difference between the first set of modifications to the plurality of user interface elements.

In Example 9, the subject matter of Example 8 optionally includes the operations further comprising rendering an annotated version of the first page, the annotated version of the first page comprising at least one indicator rendered in association with a first user interface element of the plurality of user interface elements, the first user interface element being described by the difference data.

In Example 10, the subject matter of any one or more of Examples 1-9 optionally includes the operations further comprising: receiving, from an administrative user, an indication of the first role and an indication of the second role; serving, to the administrative user, the first page of the user interface; and serving, to the administrative user, a second role version of the first page of the user interface, the second role version being based at least in part on the second adaptation configuration file.

Example 11 is a method of rendering a user interface for an application, the method comprising: receiving, by a computing system and from a user, a request for a first page of the user interface; accessing, by the computing system, user role datacontext data for the user, the user role datacontext data indicating that the user is associated with a first role and also associated with a second role; accessing, by the computing system, user interface baseline data describing a plurality of user interface elements; accessing, by the computing system, a first adaptation configuration file associated with the first role, the first adaptation configuration file describing a first set of modifications to the plurality of user interface elements, and the first adaptation configuration file comprising first role priority datapriority data; accessing, by the computing system, a second adaptation configuration file associated with the second role, the second adaptation configuration file describing a second set of modifications to the plurality of user interface elements, and the second adaptation configuration file comprising second role priority datapriority data; selecting, by the computing system, the first adaptation configuration file, the selecting being based at least in part on the first role priority datapriority data and the second role priority datapriority data; rendering, by the computing system, the first page of the user interface, the rendering comprising applying a portion of the first set of modifications to the plurality of user interface elements; and serving the first page of the user interface to the user.

In Example 12, the subject matter of Example 11 optionally includes receiving, by the computing system, a request for a second page of the user interface, the second page being different than the first page; selecting, by the computing system, the second adaptation configuration file for the second page, the selecting being based at least in part on the first role priority datapriority data and the second role priority datapriority data; and rendering the second page, at least in part by applying a portion of the second set of modifications to the plurality of user interface elements.

In Example 13, the subject matter of any one or more of Examples 11-12 optionally includes the rendering of the first page of the user interface comprising: determining a set of user interface elements for the first page of the user interface based at least in part on the user interface baseline data and the first adaptation configuration file; and determining a set of user interface element states for the set of user interface elements based at least in part on the user interface baseline data and the first adaptation configuration file, the rendering of the first page of the user interface being based at least in part on the set of user interface element states.

In Example 14, the subject matter of any one or more of Examples 11-13 optionally includes accessing, by the computing system, a batch change configuration file describing a batch set of modifications to the plurality of user interface elements, the rendering of the first page of the user interface further comprising applying the batch set of modifications to the plurality of user interface elements.

In Example 15, the subject matter of any one or more of Examples 11-14 optionally includes receiving, by the computing system and from the user, a request to receive a second role version of the first page of the user interface based on the second role; applying a portion of the second set of modifications to the plurality of user interface elements to generate the second role version of the first page; and serving the second role version of the first page to the user.

In Example 16, the subject matter of Example 15 optionally includes the request to receive the second role version of the first page being based at least in part on the user interacting with a user interface element at the first page of the user interface.

In Example 17, the subject matter of any one or more of Examples 15-16 optionally includes the request to receive the second role version of the first page being based at least in part on the user providing a second role address associated with the first page.

In Example 18, the subject matter of any one or more of Examples 11-17 optionally includes determining, by the computing system, difference data describing at least one difference between the first set of modifications to the plurality of user interface elements.

In Example 19, the subject matter of Example 18 optionally includes rendering an annotated version of the first page, the annotated version of the first page comprising at least one indicator rendered in association with a first user interface element of the plurality of user interface elements, the first user interface element being described by the difference data.

Example 20 is a non-transitory machine-readable medium comprising instructions thereon that, when executed by at least one processor, because the at least one processor to perform operations comprising: receiving, from a user, a request for a first page of a user interface; accessing user role datacontext data for the user, the user role datacontext data indicating that the user is associated with a first role and also associated with a second role; accessing user interface baseline data describing a plurality of user interface elements; accessing a first adaptation configuration file associated with the first role, the first adaptation configuration file describing a first set of modifications to the plurality of user interface elements, and the first adaptation configuration file comprising first role priority datapriority data; accessing a second adaptation configuration file associated with the second role, the second adaptation configuration file describing a second set of modifications to the plurality of user interface elements, and the second adaptation configuration file comprising second role priority datapriority data; selecting the first adaptation configuration file, the selecting being based at least in part on the first role priority datapriority data and the second role priority datapriority data; rendering the first page of the user interface, the rendering comprising applying a portion of the first set of modifications to the plurality of user interface elements; and serving the first page of the user interface to the user.

Figure 9:
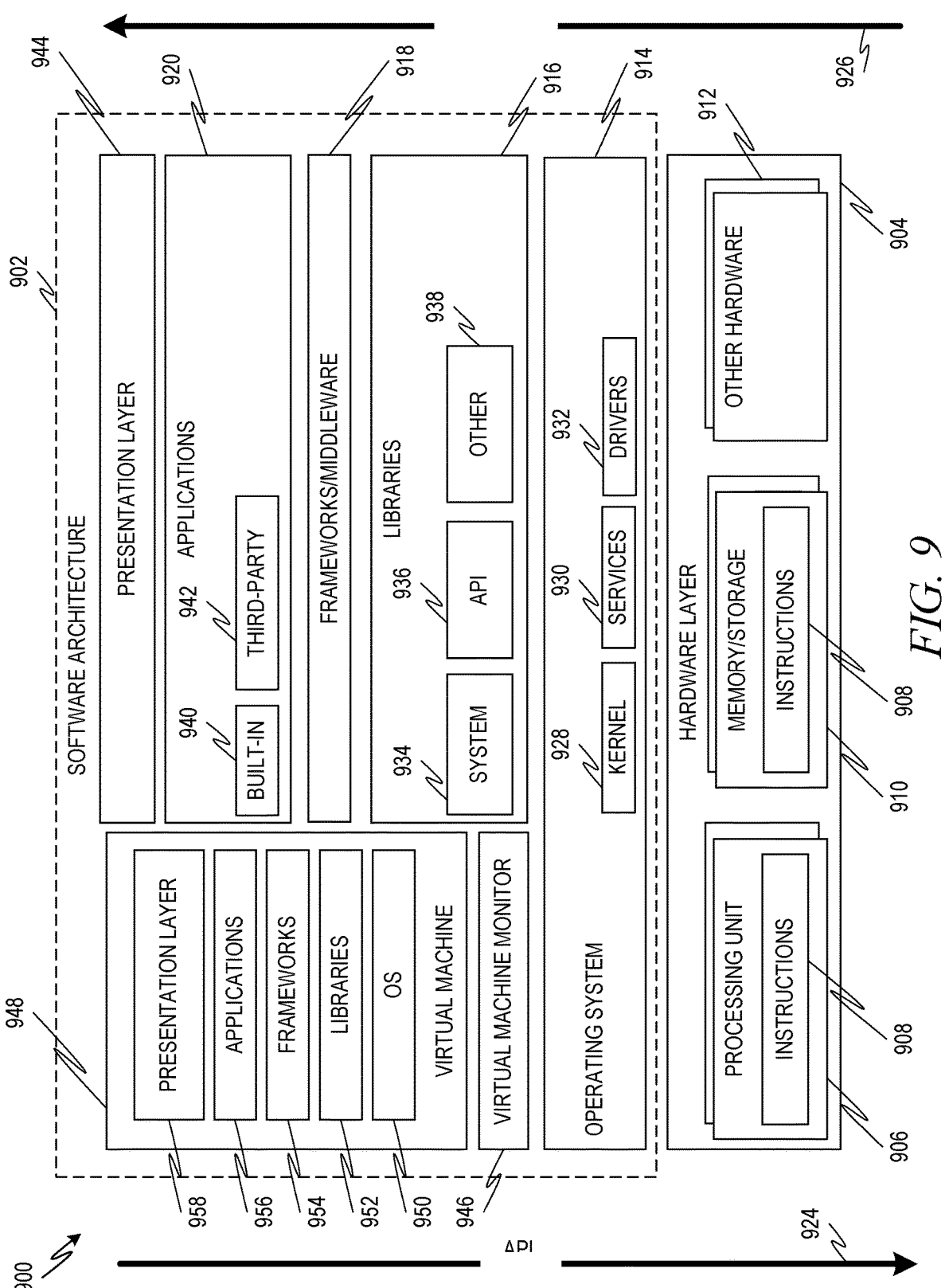
FIG. 9 is a block diagram showing one example of an architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the architecture 902.

In the example architecture of FIG. 9, the software architecture 902 may be conceptualized as a stack of layers where each layer provides particular functionality. For example, the software architecture 902 may include layers such as an operating system 914, libraries 916, middleware layer 918, applications 920, and presentation layer 944. Operationally, the applications 920 and/or other components within the layers may invoke API calls 924 through the software stack and access a response, returned values, and so forth illustrated as messages 926 in response to the API calls 924. The layers illustrated are representative in nature and not all software architectures have all layers. For example, some mobile and/or special purpose operating systems may not provide a middleware layer 918, while others may provide such a layer. Other software architectures may include additional and/or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling and/or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The middleware layer 918 (also sometimes referred to as frameworks) may provide a higher-level common infrastructure that may be utilized by the applications 920 and/or other software components/modules. For example, the middleware layer 918 may provide various graphic user interface (GUI) functions, high-level resource management, high-level location services, and so forth. The middleware layer 918 may provide a broad spectrum of other APIs that may be utilized by the applications 920 and/or other software components/modules, some of which may be specific to a particular operating system and/or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, API libraries 936, and other libraries 938), and middleware layer 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
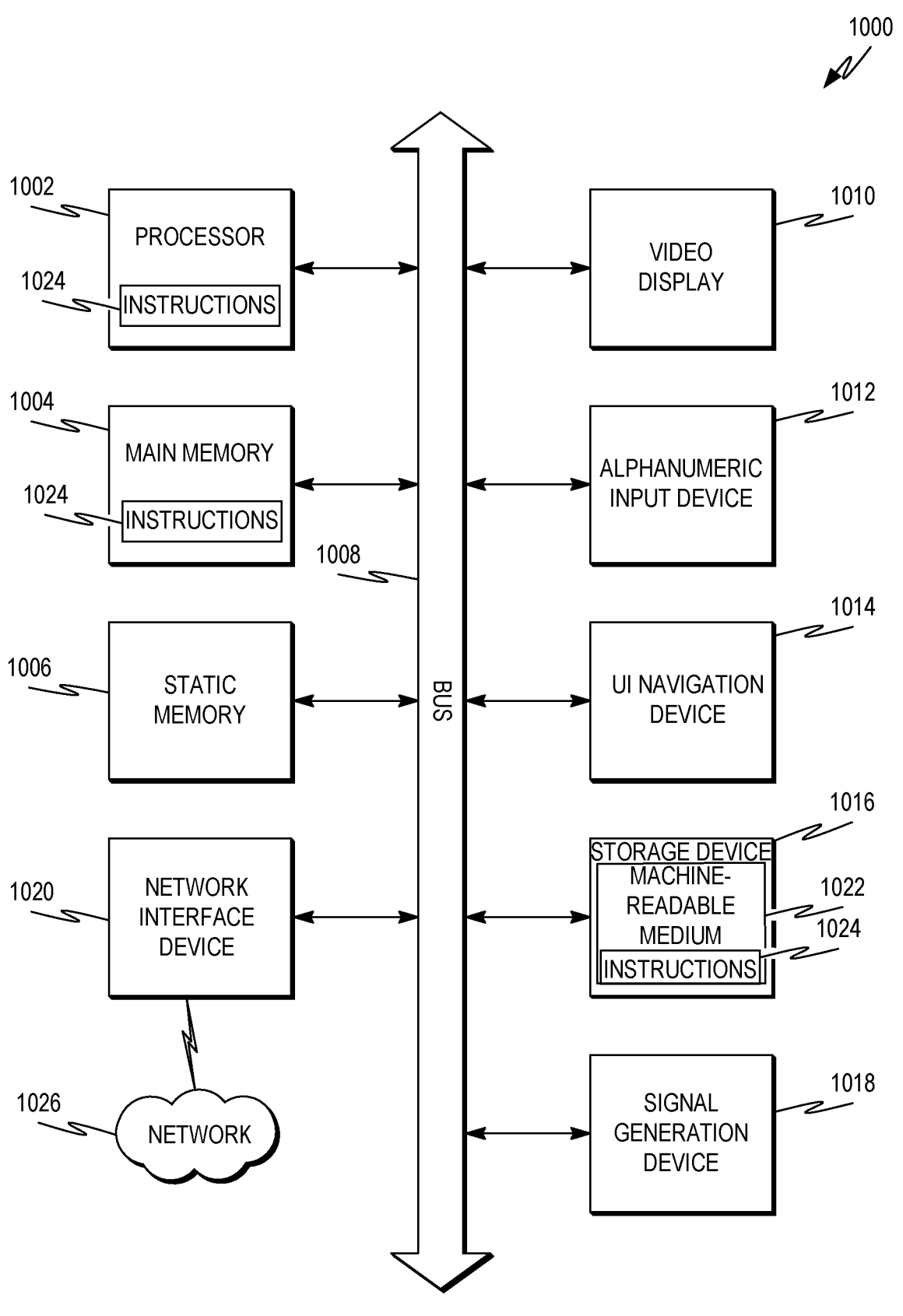
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computing system for serving a user interface to a user, the computing system comprising:

at least one processor programmed to perform operations comprising:

receiving, from a user, a request for a first page of the user interface;

accessing context data for the user, the context data indicating that the user is associated with a first role and also associated with a second role;

accessing user interface baseline data describing a plurality of user interface elements;

accessing a first adaptation configuration file associated with the first role, the first adaptation configuration file describing a first set of modifications to the plurality of user interface elements, and the first adaptation configuration file comprising first priority data;

accessing a second adaptation configuration file associated with the second role, the second adaptation configuration file describing a second set of modifications to the plurality of user interface elements, and the second adaptation configuration file comprising second priority data;

selecting the first adaptation configuration file, the selecting being based at least in part on the first priority data and the second priority data;

rendering the first page of the user interface, the rendering comprising applying a portion of the first set of modifications to the plurality of user interface elements; and serving the first page of the user interface to the user.

2. The computing system of claim 1, the operations further comprising:

receiving, by the computing system, a request for a second page of the user interface, the second page being different than the first page;

selecting, by the computing system, the second adaptation configuration file for the second page, the selecting being based at least in part on the first priority data and the second priority data; and rendering the second page, at least in part by applying a portion of the second set of modifications to the plurality of user interface elements.

3. The computing system of claim 1, the rendering of the first page of the user interface comprising:

determining a set of user interface elements for the first page of the user interface based at least in part on the user interface baseline data and the first adaptation configuration file; and determining a set of user interface element states for the set of user interface elements based at least in part on the user interface baseline data and the first adaptation configuration file, the rendering of the first page of the user interface being based at least in part on the set of user interface element states.

4. The computing system of claim 1, the operations further comprising accessing, by the computing system, a batch change configuration file describing a batch set of modifications to the plurality of user interface elements, the rendering of the first page of the user interface further comprising applying the batch set of modifications to the plurality of user interface elements.

5. The computing system of claim 1, the operations further comprising:

receiving, by the computing system and from the user, a request to receive a second role version of the first page of the user interface based on the second role;

applying a portion of the second set of modifications to the plurality of user interface elements to generate the second role version of the first page; and serving the second role version of the first page to the user.

6. The computing system of claim 5, the request to receive the second role version of the first page being based at least in part on the user interacting with a user interface element at the first page of the user interface.

7. The computing system of claim 5, the request to receive the second role version of the first page being based at least in part on the user providing a second role address associated with the first page.

8. The computing system of claim 1, the operations further comprising determining, by the computing system, difference data describing at least one difference between the first set of modifications to the plurality of user interface elements.

9. The computing system of claim 8, the operations further comprising rendering an annotated version of the first page, the annotated version of the first page comprising at least one indicator rendered in association with a first user interface element of the plurality of user interface elements, the first user interface element being described by the difference data.

10. The computing system of claim 1, the operations further comprising:

receiving, from an administrative user, an indication of the first role and an indication of the second role;

serving, to the administrative user, the first page of the user interface; and serving, to the administrative user, a second role version of the first page of the user interface, the second role version being based at least in part on the second adaptation configuration file.

11. A method of rendering a user interface for an application, the method comprising:

receiving, by a computing system and from a user, a request for a first page of the user interface;

accessing, by the computing system, context data for the user, the context data indicating that the user is associated with a first role and also associated with a second role;

accessing, by the computing system, user interface baseline data describing a plurality of user interface elements;

accessing, by the computing system, a first adaptation configuration file associated with the first role, the first adaptation configuration file describing a first set of modifications to the plurality of user interface elements, and the first adaptation configuration file comprising first priority data;

accessing, by the computing system, a second adaptation configuration file associated with the second role, the second adaptation configuration file describing a second set of modifications to the plurality of user interface elements, and the second adaptation configuration file comprising second priority data;

selecting, by the computing system, the first adaptation configuration file, the selecting being based at least in part on the first priority data and the second priority data;

rendering, by the computing system, the first page of the user interface, the rendering comprising applying a portion of the first set of modifications to the plurality of user interface elements; and serving the first page of the user interface to the user.

12. The method of claim 11, further comprising:

receiving, by the computing system, a request for a second page of the user interface, the second page being different than the first page;

selecting, by the computing system, the second adaptation configuration file for the second page, the selecting being based at least in part on the first priority data and the second priority data; and rendering the second page, at least in part by applying a portion of the second set of modifications to the plurality of user interface elements.

13. The method of claim 11, the rendering of the first page of the user interface comprising:

determining a set of user interface elements for the first page of the user interface based at least in part on the user interface baseline data and the first adaptation configuration file; and determining a set of user interface element states for the set of user interface elements based at least in part on the user interface baseline data and the first adaptation configuration file, the rendering of the first page of the user interface being based at least in part on the set of user interface element states.

14. The method of claim 11, further comprising accessing, by the computing system, a batch change configuration file describing a batch set of modifications to the plurality of user interface elements, the rendering of the first page of the user interface further comprising applying the batch set of modifications to the plurality of user interface elements.

15. The method of claim 11, further comprising:

receiving, by the computing system and from the user, a request to receive a second role version of the first page of the user interface based on the second role;

applying a portion of the second set of modifications to the plurality of user interface elements to generate the second role version of the first page; and serving the second role version of the first page to the user.

16. The method of claim 15, the request to receive the second role version of the first page being based at least in part on the user interacting with a user interface element at the first page of the user interface.

17. The method of claim 15, the request to receive the second role version of the first page being based at least in part on the user providing a second role address associated with the first page.

18. The method of claim 11, further comprising determining, by the computing system, difference data describing at least one difference between the first set of modifications to the plurality of user interface elements.

19. The method of claim 18, further comprising rendering an annotated version of the first page, the annotated version of the first page comprising at least one indicator rendered in association with a first user interface element of the plurality of user interface elements, the first user interface element being described by the difference data.

20. A non-transitory machine-readable medium comprising instructions thereon that, when executed by at least one processor, because the at least one processor to perform operations comprising:

receiving, from a user, a request for a first page of a user interface;

accessing context data for the user, the context data indicating that the user is associated with a first role and also associated with a second role;

accessing user interface baseline data describing a plurality of user interface elements;

accessing a first adaptation configuration file associated with the first role, the first adaptation configuration file describing a first set of modifications to the plurality of user interface elements, and the first adaptation configuration file comprising first priority data;

accessing a second adaptation configuration file associated with the second role, the second adaptation configuration file describing a second set of modifications to the plurality of user interface elements, and the second adaptation configuration file comprising second priority data;

selecting the first adaptation configuration file, the selecting being based at least in part on the first priority data and the second priority data;

rendering the first page of the user interface, the rendering comprising applying a portion of the first set of modifications to the plurality of user interface elements; and serving the first page of the user interface to the user.

* * * * *